Feb. 11, 1958  H. J. M. FÖRSTER  2,822,901
APPARATUS FOR CONTROLLING THE STARTING AND OPERATION
OF MOTOR VEHICLES OR OTHER MOTOR-DRIVEN MACHINES
Filed March 15, 1951  4 Sheets-Sheet 1
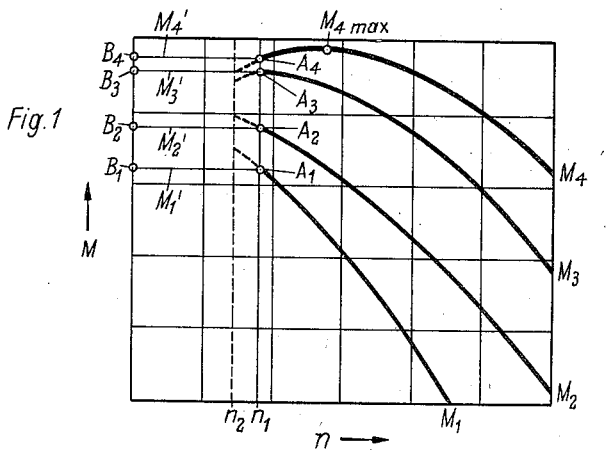
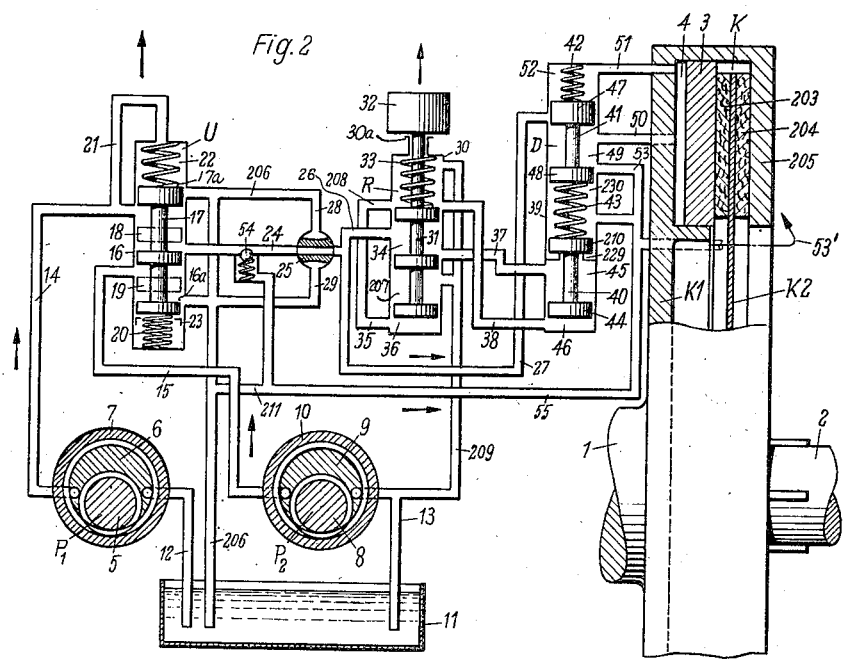
Inventor
Hans Joachim M. Förster
By Hicke and Padlen
Attorneys

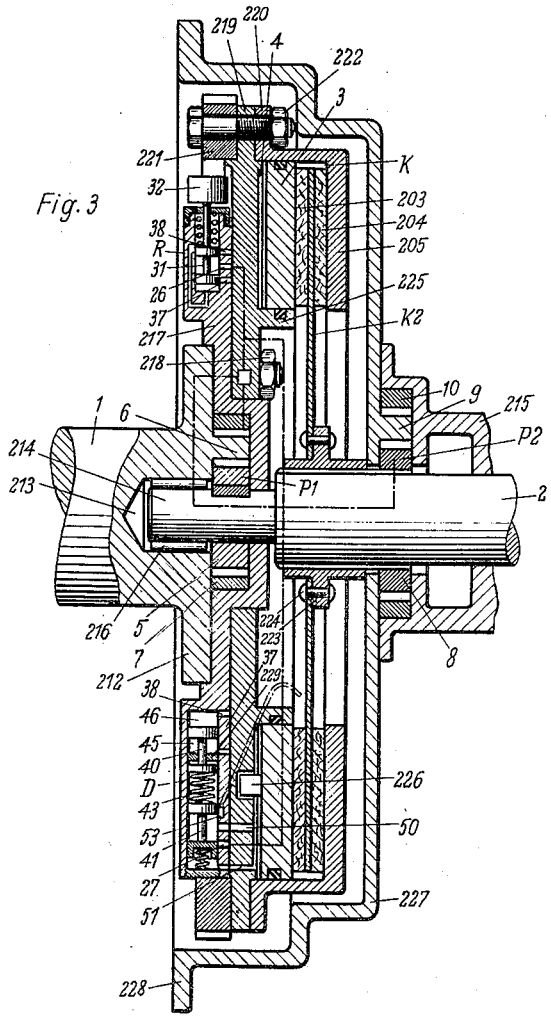

Feb. 11, 1958    H. J. M. FÖRSTER    2,822,901
APPARATUS FOR CONTROLLING THE STARTING AND OPERATION
OF MOTOR VEHICLES OR OTHER MOTOR-DRIVEN MACHINES
Filed March 15, 1951    4 Sheets-Sheet 3

Inventor
Hans Joachim M. Förster
By Hicke and Padlon
Attorneys

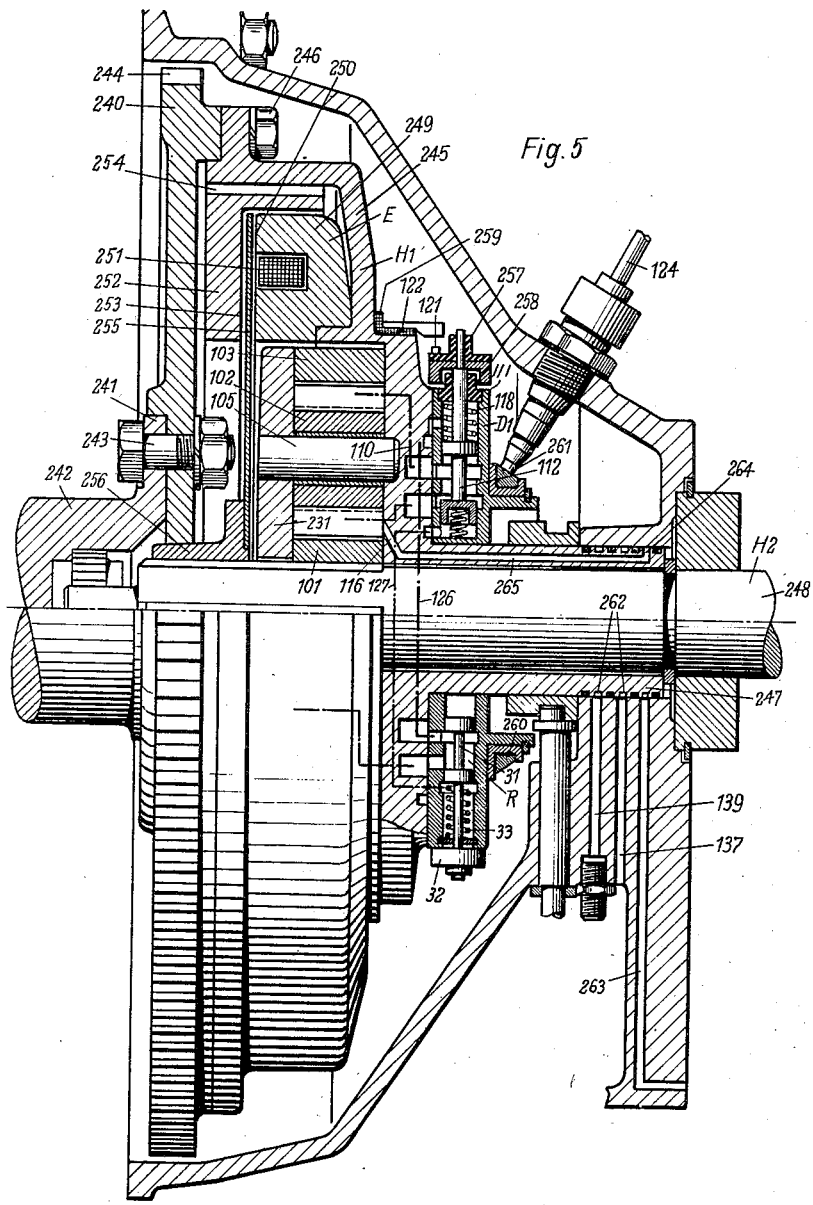

United States Patent Office 2,822,901
Patented Feb. 11, 1958

2,822,901

APPARATUS FOR CONTROLLING THE STARTING AND OPERATION OF MOTOR VEHICLES OR OTHER MOTOR-DRIVEN MACHINES

Hans Joachim M. Förster, Stuttgart-Bad Cannstatt, Germany, assignor to Daimler-Benz Aktiengesellschaft, Stuttgart-Unterturkheim, Germany Application March 15, 1951, Serial No. 215,847

Claims priority, application Germany March 16, 1950

35 Claims. (Cl. 192—.096)

My invention relates to clutches and apparatus and method for controlling their operation, and particularly adapted for controlling the process of starting motor vehicles or other motor-driven machines and, more particularly, to the control of a motor vehicle or motor-driven machine in which means for transforming the speed, such as a friction clutch, an electric clutch, a hydrostatic clutch or transmission, or the like, is interposed between the driving member and the driven member. My invention is also applicable to torque transformers of the asynchronous type, such as a torque converter, in which the driven member lags behind the driving member.

It is the object of the present invention to render the starting process of a motor vehicle driven by an internal combustion engine through a clutch, more particularly through a friction clutch or a hydrostatic clutch, entirely automatic.

Further objects of my invention are to provide simple means performing the starting process in a theoretically correct manner irrespective of the throttle adjustment; to eliminate the influence of variations of the coefficient of friction on the effectiveness of the clutch and on the speed of the driven member geared to the wheels of the vehicle or to any other machine; to avoid any reaction of the driven clutch member on the driving clutch member which would adversely affect the speed of the internal combustion engine during the starting process.

It is a further object of my invention, when applied to hydraulic clutches, to eliminate the influence of the condition of the fluid, such as variations in viscosity and, when applied to electro-magnetic clutches, to eliminate the influence of variations in the air gap; to provide means which, when the vehicle is started, become operative at a certain speed of the engine to engage the clutch and which, when the vehicle is slowed down, will become operative at a lower speed limit of the engine to disengage the clutch thus securing what will be called hereinafter a "hysteresis effect"; to provide simple means, such as means for interrupting or short-circuiting a fluid circuit, for disengaging the clutch when it is desired that the engine should run idly, or that a speed change transmission connected with the driven clutch member be operated to shift the gears; and to use the clutch-control fluid for cooling the friction clutch of a motor vehicle, the cooling effect being proportional to the slip.

Further objects and features of the present invention will appear from the detailed description of various illustrative embodiments of my invention following hereinafter.

In the drawings:

Fig. 1 is a graph representing the torque produced by an internal combustion engine at various throttle adjustments and at different speeds and the torque transmitted to the driven member of the clutch during the starting operation.

Fig. 2 is a hydraulic circuit diagram of a clutch provided with a fluid control system in accordance with the present invention.

Fig. 3 is an axial section of a clutch embodying the control system diagrammatically shown in Fig. 2.

Fig. 4 is a hydraulic circuit diagram of a combined hydrostatic and magnetic clutch, while Fig. 5 is an axial section of the combined hydrostatic and magnetic clutch shown diagrammatically in Fig. 4.

Figure 4:
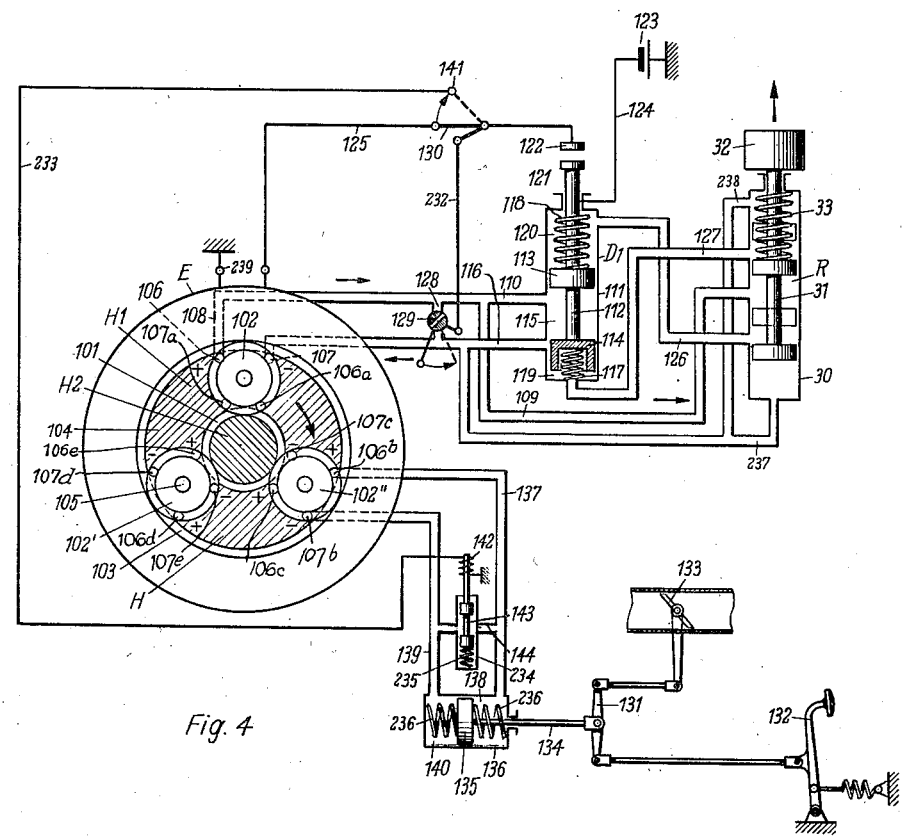

In the graph shown in Fig. 1 each of the four curves denoted by M1, M2, M3, and M4 represents the torque M produced by an internal combustion engine with a given throttle adjustment depending on the speed and showing how such torque M varies with an increasing or decreasing number of revolutions per minute. Thus the curve M4 represents the torque M which the engine develops at various speeds $n$ with its throttle being fully opened. $n_1$ denotes the starting speed of the engine, i. e. the speed at which the internal combustion engine shall operate while the friction clutch connecting the driving shaft with the driven shaft is being engaged, such starting speed being so elected as to result in a high torque approaching the maximum torque M4 max. produced with fully opened throttle but yet so as to be reasonably low. $n_2$ denotes the disengagement speed, i. e. the minimum speed at which the clutch is still kept in engaged condition, a reduction of the engine speed below $n_2$ resulting in a disengagement of the clutch. It will be noted that the disengagement speed $n_2$ is lower than the starting speed $n_1$. This is important in order to attain an effect which, because of its similarity to the phenomenon of the magnetic hysteresis, will be referred to hereinafter as the "hysteresis effect."

The starting operation that is to be accomplished by means of the novel clutch control system takes place as follows:

Let it be assumed that the driven clutch member, geared to the wheels of a vehicle for instance, be at rest while the clutch is disengaged and the engine is idling. Let it further be assumed that the engine be now accelerated by fully opening its throttle. As a result, the engine will develop a torque M represented by the curve M4. Being accelerated by that torque, it will soon reach the speed $n_1$ developing the torque A4. When the engine speed exceeds the limit $n_1$, the novel clutch control system to be described hereinafter will automatically become operative to engage the clutch, controlling the pressure of engagement and, consequently, the torque transferred to the driven clutch member in such a manner as to maintain the engine speed substantially at $n_1$ transferring the torque A4 to the driven clutch member, thus starting and accelerating the vehicle or other driven device. Should the clutch-engaging pressure tend to become excessive, the increased clutch friction will tend to slow down the engine below the speed $n_1$. The novel control system, however, responds to such speed reduction by reducing the clutch pressure, thereby permitting the engine to accelerate. Should such acceleration result in excessive speed surpassing $n_1$ substantially, the novel control system will increase the clutch pressure again, thus reducing the engine speed keeping it substantially at the rate $n_1$. In this manner, the torque A4 is transferred from the engine to the vehicle or other driven device by the clutch, while the engine keeps running substantially at the rate $n_1$, until the vehicle has been accelerated to a speed at which the driven clutch member has caught up with the driving clutch member rotating at the same speed or, in other words, until the primary member and the secondary member of the clutch have been synchronized. The torque accelerating and driven device is indicated in Fig. 1 by the horizontal line M4' for the operation of the engine with a fully opened throttle. Each of the lines M3′, M2′ and M1′ indicates the torque transferred with another throttle position.

It will be appreciated from the foregoing explanation that, while the engine is kept running substantially at the rate $n_1$, a substantially constant torque is transferred to the driven clutch member, provided the throttle adjustment will not be varied. Thus, with a constant throttle adjustment, the constant number of revolutions of the engine means at the same time the transfer of a constant torque so that during the starting process the secondary clutch member and the driven device geared thereto will be accelerated on the horizontal line M4′ from the point B4 to the point A4. A corresponding operation will be obtained with partial loads, i. e. with a partly opened throttle adjustment, corresponding to the horizontal lines M3′, M2′, M1′, etc. With the lower partial loads indicated at M1′ and M2′ the maximum torque that can be developed with the corresponding throttle adjustments will be no longer transferred by the clutch, since the torques A1 and A2 are positioned far below the maximum indicated by the highest points of the curves M1 and M2. As a matter of principle, however, in all of such cases the starting operation is performed in such a manner that as long as the same throttle adjustment is maintained between the full stop and the starting rate $n_1$, the torque acting on the secondary clutch member is kept constant corresponding to the constant speed of the engine, the torque changing in accordance with the curve M4, M3, M2, or M1 respectively, only after the rate of speed will have been increased above $n_1$ after the primary clutch member and the secondary clutch member have been synchronized.

In Fig. 2 a control system adapted to accomplish the aforedescribed operation is illustrated by way of a hydraulic circuit diagram. In this diagram P1 is a primary pump comprising two relatively rotatable elements 5 and 6, one of said elements being co-operatively connected with the primary or driving clutch member K1, while the other pump element is co-operatively connected with the driven or secondary clutch member K2 of a friction clutch K. P2 denotes a secondary pump comprising a stator 9 and a rotor 8, the latter being co-operatively connected with the secondary clutch member K2. R denotes a starting speed controller, D a pressure controller and U a shifting device adapted to alternatively subject the clutch K either to the pressure produced by the primary pump P1 or to the pressure produced by the secondary pump P2. The starting speed controller R constituted by a spring-controlled slide valve connected with a fly weight is mounted for common rotation with the primary member K1 of the clutch so as to produce a centrifugal force acting in the direction of the arrow in Fig. 2. The pressure controller D and the shifting device U are likewise formed by slide valves. While they could be mounted in a stationary condition, they are mounted in the instant embodiment for common rotation with the primary clutch member K1.

The clutch K is a fluid-operated friction clutch comprising a primary clutch member K1 and a secondary clutch member K2, the member K1 being connected with the driving shaft 1, e. g. with the engine shaft 1, whereas the secondary clutch member being formed as a clutch disk K2 is mounted for common rotation with the driven shaft 2 geared by means of a speed change transmission to the wheels of the vehicle. The primary clutch member K1 comprises a substantially cylindrical casing forming an annular cylindrical space 4 in which an annular piston 3 provided with a clutch lining 203 is movable in axial direction, the piston 3, when urged by fluid pressure in space 4 to move towards the right, being adapted to clamp the disk K2 against a lining 204 attached to a flange 205 forming part of the casing K1, thereby engaging the clutch.

In the embodiment shown in Fig. 2 the primary pump and the secondary pump are constituted by gear pumps each having an outer annular spur gear with internal teeth and an inner spur gear meshing therewith. The gear 5 of the primary pump P1 constitutes one of two rotors and is mounted for common rotation with the driven shaft 2, whereas the pump casing including the part 6 constitutes a secondary rotor mounted for common rotation with the driving shaft 1 of the clutch. The internal gear 7 is driven by the gear 5. Since pumps of that kind are well known in the art, a detailed description thereof is deemed dispensable here. The inner gear 8 of the secondary pump P2 is likewise mounted for common rotation with the driven shaft 2 of the clutch, whereas the casing including the member 9 is stationary being preferably mounted on the clutch casing or transmission casing. The internal gear 10 of the pump P2 meshes with the gear 8 and is driven thereby.

Each of the two pumps has a suction line 12, or 13 respectively, communicating with a supply tank 11 and a pressure line 14, or 15 respectively, communicating with ports provided in the cylindrical casing 16 of the shifting device U. This shifting device is formed by a cylindrical slide valve 17 movably guided in the cylindrical casing 16 and provided with peripheral grooves or recesses 18 and 19 adapted to co-operate with a number of ports provided in the wall of casing 16. The latter is so mounted on the primary clutch member K1 in radial position that a centrifugal force will act on the valve member 17 in the direction of the arrow. Moreover, a spring 20 inserted in cylinder 16 below the valve member acts on the same supporting the centrifugal force. A branch 21 of the pressure line 14 communicates with the top of the cylinder 16 causing fluid under pressure to act on the top face of the valve member 17 depressing the same and holding it in contact with an abutment 23 fixed to the interior of the cylindrical casing 16. When the valve member assumes that position, which it does as long as pump P1 feeds or, in other words, until the clutch has been fully engaged, the pressure line 14 of the primary pump communicates through the peripheral groove 18 of the valve member 17 with a pipe 24, whereas the pressure pipe 15 of the pump P2 communicates via the peripheral groove 19 of the valve member 17 and a suitable port in the cylindrical wall with a discharge line 206 returning to the tank 11. The line 24 may be connected by means of a rotary valve 25 with a line 26. The rotary valve 25, however, is so designed and capable of such adjustment as to connect line 24 with a line 28 only, and line 26 with a line 29 only. The two lines 28 and 29 may communicate with the return line 206. The line 26 communicates with a port provided in the cylindrical valve casing 30 of the starting speed controller R. Moreover, line 26 has a branch 27 leading to a port provided in the cylindrical casing 39 of the pressure controller D.

As stated hereinabove, the starting speed controller R comprises a slide valve member 31 movably guided in a cylindrical casing 30 and having a shaft projecting out of said casing and carrying a fly weight 32 tending, when the primary clutch member revolves, to displace the valve member 31 in the direction of the arrow contrary to the effect of a helical spring 33 inserted between the cover of the cylindrical casing 30 and the valve member 31. The latter is provided with an upper peripheral groove 34 and with a lower peripheral groove 207. The groove 34 communicates with the pipe 26 in any position of valve member 31. A shunt pipe 35 connects the bottom space 36 of casing 30 with a port 208 provided in the casing 30 at such a position as to communicate with pipe 26 via the groove 34 when the valve member 31 has been outwardly displaced by the centrifugal force.

In the embodiment shown in Fig. 2 the valve member 31 assumes its innermost position in which the fly valve 31 rests on a bushing 30a integral with casing 30.

Two lines 37 and 38 communicating with suitable ports provided in the casing 30 extend to ports provided in the cylindrical casing 39 of the pressure controller D, the arrangement being such that each of the two lines 37 and 38 may be alternatively connected to the pressure line 26 or a return line 209 which communicates with ports suitably provided in the casing 30.

The cylindrical casing 39 accommodates a piston 44 and a valve member 41, the latter being subject to the influence of springs 42 and 43. The spring 42 is inserted between the top cover of casing 39 and the top face of valve member 41, whereas the spring 43 is inserted between the valve member 41 and a collar 210 attached to the piston rod 40 of piston 44. The piston 44 is movable between a lower port communicating with line 38 and an upper port connecting the cylinder space 45 with line 37. In Fig. 2 the piston 44 is shown in its lowermost position in which the collar 210 abuts against a partition 229. This partition is provided in the casing 39 being sealed against the piston rod 40 and serving to separate the cylindrical space 45 from the space 230 accommodating spring 43. The space 230 permanently communicates with a discharge line 53 to be referred to hereinafter and is thus relieved from internal fluid pressure.

The valve member 41 has a peripheral groove 49 intermediate its upper end 47 and its lower end 48. The peripheral groove 49 permanently communicates by a port and a line 50 with the pressure space 4 of the clutch K. Moreover, a pipe 51 establishes a communication between the periphery of the cylindrical space 4 and the space 52 provided in the top of the casing 39 above the valve member 41. The space 52 accommodates the helical spring 42. A discharge pipe 53 communicates with a port provided in the casing 39 for control by part 48 of valve member 41 and terminates in a nozzle 53' or the like adapted to spray the discharge oil against the flange 205 of the clutch K for the purpose of cooling the same. Line 53 has a branch 55 for the discharge of a spring-controlled relief valve 54 connected with the pipe 24 and adapted, when the pressure in pipe 24 exceeds a certain limit, to discharge oil into the pipe 55.

The operation of the control system hereinabove described is as follows:

When the vehicle is at rest and the engine is idling, the pump rotor 6 participates in the rotation of shaft 1 while the pump rotor 5 revolves together with shaft 2. Therefore, the primary pump P1 will feed the oil or other operating fluid, the output of the pump P1 being proportional to the relative rotation of the two shafts 1 and 2 and the clutch members rotating therewith.

In this phase of the operation, the shifting device U, the starting speed controller R, the pressure controller D, and the valve 25 assume the positions shown in Fig. 2. The fluid fed by pump P1 is supplied through line 14 to both the peripheral groove 18 of valve member 17 and the space 22 at the top of casing 16 thus keeping valve member 17 in its lower position in contact with the abutment 23 as shown. Consequently, the pressure fluid will flow from the line 14 through groove 18 into lines 24, 26 and 27 and will set up pressure in the peripheral groove 34 of the starting speed controller R. Since the engine is idling, the throttle valve of the engine being adjusted for a limited power output and a low speed, the spring 33 will overcome the centrifugal force produced by the fly weight 32 and will keep the valve member 31 in the position shown in which the groove 34 communicates through pipe 37 with the pressure space 45 in cylinder 39. At the same time, the bottom space 46 thereof communicates via pipe 38 and the top space in casing 30 with the discharge pipe 209. Consequently, piston 44 will be depressed and held in its lowermost position in which the spring 43 is relaxed. The valve member 41 is kept by spring 42 in the position shown in which the port communicating with line 27 is closed and in which the port communicating with the discharge pipe 53 is open. Thus the peripheral groove 49 and space 4 are relieved from pressure.

Let it now be assumed that the throttle of the engine be opened thus accelerating the rotary speed of shaft 1 and of the clutch member K1. As a result, the centrifugal force acting on valve member 41 will move same outwardly contrary to the effect of spring 42 and will partially shut off groove 49 from the discharge pipe 53 and connect it with the pressure pipe 27, thus causing pressure oil to be supplied through conduit 50 to the pressure space 4 of the clutch, thereby moving piston 3 into contact with the disk K taking up any lost motion therebetween. The pressure oil is admitted from space 4 through channel 51 to the top space 52 in cylinder 39 thus aiding spring 42 in keeping valve 41 balanced in a position in which so much only of the port of pressure pipe 27 is uncovered and so much of the port of discharge pipe 53 throttled that the resulting pressure in groove 49 and in space 4 communicating therewith is still kept very low. As soon, however, as the engine, as a result of the opening of the throttle, has accelerated to a degree exceeding the predetermined starting rate $n_1$, the fly weight 32 will lift valve member 31 contrary to the effect of spring 33, whereby the starting speed controller R will establish a path for the pressure oil from line 26 via peripheral groove 34 and line 38 to the bottom space 46 of the casing 39, at the same time connecting space 45 via line 37 and groove 207 with the discharge line 209. As a result, piston 44 will be lifted to bias spring 43. Because of this bias the valve member 41 will assume a new position causing a larger pressure to be built up in groove 49, space 4 and space 52. Thus it will be appreciated that the increase of the engine speed beyond the rate $n_1$ results in an increase of the clutch pressure. The increased clutch pressure, however, by the consequently increased friction will tend to slow down the engine considering that the vehicle is either still at a full stop or is running at a slow speed. Should the speed of the engine be reduced below $n_1$, the fly weight 32 and valve member 31 will be temporarily returned an amount sufficient to emit a pressure impulse through line 37 causing piston 44 to reduce the bias of spring 43, whereby the pressure set up in space 4 will be decreased accordingly permitting the engine to pick up speed.

Another effect of the acceleration of the engine is an increase of the output of the pump P1, thus ensuring an increased cooling effect on the clutch by the fluid discharged from pipe 53.

Thus any increase of the engine speed above the rate $n_1$ will result in an increased clutch pressure, whereas a drop of the engine speed below the rate $n_1$ will result in an immediate reduction of the clutch pressure partly relieving the engine and permitting it to pick up speed. In this manner, the engine speed will be maintained substantially at the rate $n_1$ while the vehicle is being accelerated.

If desired, the line 206 in lieu of discharging into the tank 11 may communicate with the line 55, as indicated by the line 211. As a result, the oil fed by the secondary pump P2 will be discharged through line 55 into line 53' and will thus contribute to the cooling of the clutch. Suitable means, not shown, are provided to collect the oil at the bottom of the clutch casing and to return it to the tank 11.

The next stage of the operation will be reached when the secondary clutch member K2 and the vehicle geared thereto will have picked up sufficient speed to approach the starting rate $n_1$. When that happens the output of the primary pump P1, depending as it does upon the lag of the secondary clutch element behind the primary clutch element, will drop so far that the pressure in space 22 of casing 16 is reduced to a point where it can be overcome by spring 20, the fluid entrapped in space 22 being discharged by leakage around piston member 17a of slide valve 17.

However, the pump P2 having an output proportional to the speed of the secondary clutch member will now feed a powerful oil current through line 15, the upward displacement of valve member 17 by the spring 20 connecting the secondary pump P2 in lieu of the primary pump P1 with the pressure line 24 and connecting the primary pump P1 with the upper port of the exhaust line 206, at the same time closing the lower port 16a thereof, thus disabling the primary pump P1 and enabling the secondary pump P2 to supply the pressure fluid.

After the secondary clutch member has attained the rotary speed $n_1$, being thus synchonized with the primary clutch member, the speed of the engine may be increased without any lag of the secondary clutch member. The pressure of the oil supplied through pipes 24, 27 and 50 to the cylinder space 4 of the clutch will increase with the rising speed of the vehicle until it will be relieved by the relief valve 54, the oil thus discharged serving to cool the clutch. When the speed $n_1$ has been surpassed, the centrifugal force exerted by the fly weight 32 is so powerful as to shift valve member 31 to its outmost position in which pressure is supplied from pipe 26 via the peripheral groove 34, port 298 and the pipe 35 to the bottom space 36 beneath valve member 31. As a result, the valve member 31 will not be restored by spring 33 when the speed drops below $n_1$. Such return will not take place until the speed is reduced by the driver below the rate $n_2$. It will thus be appreciated that the engagement of the clutch during the starting period will take place at a higher speed than a disengagement of the clutch incidental to a stoppage of the vehicle. The effect is similar to the hysteresis phenomenon of electromagnets.

When the operator desires to keep the clutch disengaged irrespective of the speed of the internal combustion engine, or to disengage the clutch for the purpose of a gear shift operation, he will turn the rotary valve 25 about 45° in either direction, thereby connecting pressure line 24 to one of the two discharge lines 28, 29, and pressure line 26 to the other one of the two discharge lines 28 and 29. In this manner, the fluid circuit will be interrupted and both pumps P1 and P2 will be short-circuited.

In Fig. 3 a friction clutch embodying the control system described hereinabove with reference to Figs. 1 and 2 is illustrated, such friction clutch being interposed between the internal combustion engine of a motor vehicle and the orthodox speed change transmission thereof.

Those elements of the clutch as are shown in Fig. 2 and have been described hereinabove with reference thereto, are designated by the same reference characters. Therefore, a comparatively brief description of the clutch shown in Fig. 3 will suffice.

The crank shaft of the engine is equipped with a flange 212 and with an axial bore 213, the latter accommodating the reduced end section 214 of the driven shaft 2, same being geared to the driven wheels of the motor vehicle by a gear shift transmission encased in a housing 215, anti-friction rollers 216 serving to journal shaft 2 in shaft 1.

Flange 212 carries a disk 217 which, in its turn, carries an annular disk 219 and is attached thereto and to flange 212 by threaded bolts and nuts 218.

The flange 205, also shown in Fig. 2, has an off-set portion 220 which is bolted to the plate 219 and to a toothed rim 221 by means of threaded bolts and nuts 222, the toothed rim 221 serving for engagement with a starting pinion in the customary manner.

A flanged bushing 223 splined upon shaft 2 carries the clutch disk K2 which is suitably fixed thereto by rivets 224. The annular piston 3 is guided between a cylindrical flange 225 of disk 219 and a cylindrical portion of the member 205, 220 and is secured against relative rotation to the disk 219 by means of a detent 226 which is integral with and projects from the annular piston 3 into a recess in the disk 219.

The disk 217 is provided with three radial cavities constituting the casings of the controllers U, R and D, only those cavities being illustrated in Fig. 3 as constiute the controllers R and D.

The gear 5 constituting one of the two rotors of the pump P is keyed to the reduced end 214 of shaft 2, whereas the other rotor 6 of pump P1 being constituted by the housing thereof is formed by the flange 212 and the disk 217 attached thereto. Thus the part 6 is visible in Fig. 3, same being integral with the flange 212.

Similarly the gear 8 of pump P2 is keyed to shaft 2 and the casing including part 9 of pump P2 is formed by the housing 215 and by a housing 227 suitably fixed to the housing 215 and provided with an outer flange 228 bolted to the crank shaft casing of the engine. The various conduits diagrammatically shown in Fig. 2 are formed by suitable bores which need not be shown in detail since their operation and arrangement may be easily devised by anyone skilled in the art.

In Fig. 4 a combined hydrostatic and electro-magnetic clutch and the circuit diagram of a hydraulic and electrical control system therefor are illustrated. The hydrostatic clutch or torque transformer comprises a primary member H1 mounted for common rotation with the driving shaft, e. g. the crank shaft of an internal combustion engine, and a secondary member H2 mounted for common rotation with a driven shaft geared to the wheels of a vehicle or with a machine to be operated, preferably by means of a speed change transmission.

In the instant embodiment, the secondary member of the clutch is formed by a central or sun gear 101. The gear 101 meshes with a plurality of planetary gears 102, 102' and 102" mounted on a carrier 231 (Fig. 5) which is rotatable with respect to gear 101. An internally toothed ring 103 co-axially arranged with respect to the central gear 101 meshes with the planetary gears 102, 102' and 102". The space between the planetary gears, the inner gear 101 and the annular gear 103 is filled out by suitably shaped parts 104 which are integral with the planetary gear carrier 231. The planetary gear carrier 231 carries studs 105 on which the planetary gears are journalled and is nonrotatably connected with the casing of the primary clutch member H1.

Each pair of co-operating gears acts as a gear pump. Hence, the arrangement described constitutes in effect six gear pumps each having a pressure space 106, 106a, 106b, 106c, 106d, and 106e designated by "+" and a suction space 107, 107a, 107b, 107c, 107d, and 107e designated by "—" respectively, it being assumed that relative rotation of the planetary gear carrier 231 with respect to the central gear 101 takes place in the direction of the arrow. Five of the six pumps constitute a hydrostatic clutch. For sake of simplicity, however, the connections with the control circuit of but one of the five pumps, to wit the pump formed by the planetary gear 102 and the annular gear 103 is shown in the drawings.

The pressure space 106 of the pump is connected by a line 108, 109 with the starting speed controller R which, in principle, corresponds to the controller R explained hereinabove with reference to Fig. 2. Moreover, the pressure space 106 communicates through lines 108 and 110 with a throttle controller or pressure controller D1 which comprises a cylindrical cavity 111 and a slide valve member 112 movable therein. Member 112 has a peripheral groove 115 intermediate its piston-shaped ends 113 and 114. The cylindrical cavity 111 is connected by a pipe 116 with the suction space 107 of the gear pump 102, 103 of the hydrostatic clutch. The control slide valve 112 is subject to the influence of two opposed helical springs 117 and 118 inserted in the spaces 119 and 120 of the cavity 111 and is provided with an outwardly projecting stem carrying an electrical contact 121 co-operating with a stationary contact 122. The two contacts will close an electrical circuit when the valve member 112 is shifted to its outermost position by the effect of a centrifugal force or by any other suitable force. The circuit thus closed extends from a source 123 of current through conductors 124 and 125 and serves to energize an electromagnetic clutch E adapted to clutch the primary member H1 of the hydrostatic clutch to the secondary member H2 thereof for common rotation.

The starting speed controller R and the throttle controller D1 are interconnected by conduits 126 and 127 which correspond substantially to the lines 37 and 38 shown in Fig. 2. Between the pressure line 108 and the suction line 116 of the hydrostatic clutch there extends a short-circuiting conduit or pipe 128 in which a valve 129 is inserted. Valve 129 may be manually operated or it may be connected for operation with the gear shifting means of the transmissioin. Preferably, the valve 129 is connected by a link 232 for common actuation with an electrical switch 130 inserted in line 125 and having a function which will be described later.

The output of one of the pumps of the hydrostatic clutch, for instance of the pump comprising the planetary gear 102" and the annular gear 103, serves to control the throttle of the engine for a purpose which will be described later. To this end, the linkage connecting the throttle 133 with the accelerator pedal 132 includes a lever 131 which intermediate its ends is pivotally connected with a piston rod 134 attached to a piston 135 movable in a stationary cylinder 136. A pressure pipe 137 connects the pressure space of the pump formed by the gears 102' and 103 to the space 138 located at one end of the cylinder 136, whereas a suction pipe 139 of the pump is connected with the space 140 located at the other end of the cylinder 136. The piston 135 has a certain leakage in the cylinder 136. Alternatively the pipes 137, 139 may be connected by a throttle valve permitting the fluid to by-pass piston 135 when circulating from the pressure space 138 to the suction space 140. Helical springs 236 accommodated in the cylinder spaces 140 and 138 tend to keep the piston 135 in its central position.

The switch 130 above referred to is capable of assuming two positions. In one position it connects contact 122 with line 125. In the other position it connects contact 122 with a contact 141 connected by wire 233 to one termnial of a coil of a solenoid 142, the other terminal of which is connected to the ground. The core of the solenoid is connected with a slide valve 143 mounted in a stationary casing 234 which may be mounted on cylinder 136 and serves the purpose of controlling a conduit 144 connecting the pipes 137 and 139. A spring 235 having one end connected to the valve member 143 and having its other end anchored at a stationary point tends to keep valve member 143 in the position shown in which it establishes a communication between the pipes 137 and 139, thereby short-circuiting the cylinder 136 and thus permitting the springs 236 to keep piston 135 and piston rod 134 in the position shown. However, when the switch arm 130 swings upwardly to connect contact 122 with the contact 141, a circuit may be closed by throttle controller D1 that extends from ground through the battery 123, line 124, contact 121, contact 122, switch arm 130, contact 141, line 233, and coil 142 to the ground. In this circuit the solenoid 142 is energized attracting its core and displacing valve member 143 so as to interrupt the communication between the pipes 137 and 139.

The operation of the clutch and its control system illustrated in Fig. 4 is as follows:

When the engine is idling, the primary clutch member H1 revolving at a low speed, the starting speed controller R assumes its innermost position illustrated in Fig. 4 in which the fly weight 32 rests upon the bushing embracing the stem of valve member 31. In this position it is held by spring 33. The fluid entering the cylinder 30 of the starting speed controller through pipes 108 and 109 is conductd through pipe 126 to the space 120 of the cylinder of the throttle controller D1 exerting pressure on the top face of the part 113 of valve member 112 holding such valve member in its lowermost position in which the peripheral groove 115 of the valve member 112 establishes a communication between the pipes 110 and 116. As a result, the fluid pressure produced by the pump H will drop to the limit required to depress valve member 112 to and to keep it in the position described. Therefore, the hydrostatic pump H acting as a clutch circulates the fluid through the pipes 108 and 116 without transferring any substantial torque from the primary member H1 to the secondary member H2.

Let it now be assumed that the operator depresses the accelerator pedal 132 thereby opening the throttle 133. The consequent increase of the speed of the engine results in a centrifugal force acting on valve member 112 displacing same outwardly contrary to the tendency of spring 118, whereby the port in cylinder 111 communicating with pipe 116 will be throttled thus increasing the pressure in lines 108 and 109. When the speed of the engine is further increased and surpasses the starting speed $n$, the secondary clutch member H2 being still at rest, the fly weight 32 of the starting speed controller R will move outwardly establishing a more or less throttled communication between pipe 109 and the pipe 127 at the same time connecting pipe 126 with a branch 237 of the suction pipe 116, thus more or less relieving space 120 from pressure and admitting the pressure fluid to the bottom space of cylinder 111 causing valve member 112 to overcome spring 118 and to move outwardly. This has a drastic throttling effect on the port connecting pipe 116 with cylinder 111. It may be mentioned at this time that the springs 117 and 118 are unable to control the valve member 112 as long as pressure is maintained in lines 108 and 109, such pressure enabling the starting speed controller R, depending on its adjustment, to determine the position of valve member 112. As a result, the port in cylinder 111 of pipe 116 will be further throttled increasing the pressure in line 108. The fluid pressure in the pressure spaces of the gear pump has the effect, however, to transfer a torque from the driving member to the driven member causing the latter to impose a load on the engine. Should the engine by such load be slowed down below the rate $n_1$, the starting speed controller R will respond to such speed reduction by supplying pressure fluid through line 126 to the space 120 of the throttle controller D1 and by relieving line 127 connecting it with the exhaust port 238. Consequently, valve member 112 will be displaced inwardly partly unthrottling the port of line 116 in cylinder 111 and reducing the pressure in line 108 and the torque transferred correspondingly, thus permitting the engine to pick up speed. In this manner, the speed of the engine will be maintained substantially at the rate $n_1$.

The torque thus transferred to the secondary clutch member H2 depends substantially on the position of the throttle 133 only, and is substantially constant as long as such position is maintained. When the vehicle has picked up sufficient speed to cause the secondary clutch member H2 to catch up with the primary clutch member, the output of the gear pump decreases correspondingly requiring a more powerful throttling effect on pipe 116 in order to maintain the pressure in pipes 108 and 110. Once pipe 116 has been fully closed by valve member 112, the driven member revolving substantially at the same speed as the driving member, the whole output of the pump, small though it may be, is fed through pipes 108, 109 and 127 to the bottom of cylinder 111, whereby slide member 112 will be outwardly moved up to the limit closing contacts 121 and 122 and establishing a circuit extending from the ground through the battery 123, contact 121, contact 122, switch 130, line 125, winding of the electro-magnetic clutch E and the grounded terminal 239. Consequently, the electro-magnetic clutch E is energized to support the hydrostatic clutch. In this manner, the lag of the secondary member of the hydrostatic clutch behind the primary member thereof is eliminated and the consequent poor efficiency of the hydrostatic clutch is remedied. Once the electro-magnetic clutch has been energized, the pump will no longer feed and the pressure in the hydraulic system will drop to zero. Contacts 121, 122, however, remain closed as long as the rotary speed of the engine produces a centrifugal force exerted upon valve member 112 sufficient to overcome spring 118.

When the vehicle is slowed down lowering the rotary speed just mentioned to a degree permitting spring 118 to open contacts 121 and 122, the electro-magnetic clutch E will be de-energized causing the hydrostatic clutch to transfer the torque, whereby pressure will be set up in lines 108 and 109 and in the various parts of the control system communicating therewith. The spring 118 is preferably so dimensioned with respect to the weight of valve member 112 and to the centrifugal force produced thereby that the speed at which the electro-magnetic clutch is de-energized will be somewhat lower than the speed at which it was previously energized under control of the starting speed controller R thus ensuring the "hysteresis effect." Owing to such proportioning of spring 118 and the centrifugal force, the contacts 121 and 122 will be opened at a speed lower than the starting speed $n_1$, for instance at the speed $n_2$, provided that lines 108 and 109 are relieved as is the case during the stage preceding the de-energization of the electro-magnetic clutch E. Prior to the energization of the electro-magnetic clutch, i. e. during the transfer of the torque by the hydrostatic clutch, sufficient pressure will be set up in the pressure lines 108 and 109 to permit the starting speed controller R to have exclusive command of valve member 112 so that the centrifugal force and the spring 118 have no influence thereon. The controller R, however, does not permit the contact 121, 122 to be closed until the rotary speed of the engine has exceeded the starting speed. As soon as the function of the hydrostatic clutch, however, is superseded by the function of the electro-magnetic clutch, the fluid pressure produced thereby is reduced to zero disabling controller R and thus subjecting valve member 112 of the throttle controller D1 to the exclusive command by the centrifugal force and the spring 118. Therefore, the restoration of the hydrostatic clutch to effectiveness takes place at a speed lower than the starting speed.

In order to enable the clutch to be disengaged at the option of the driver as is desired, for instance, for the purpose of shifting transmission gears, the valve 129 is provided and connected with a suitable handle or pedal not shown. By manipulation thereof the operator may directly connect the pressure line 108 with the suction line 116 permitting the fluid to freely circulate through the gear pump so that no torque will be transferred from the primary clutch member to the secondary clutch member. Due to the connection by link 232 the switch 130 will be shifted to the dotted position at the same time thus interrupting the energizing circuit of the clutch E and disabling the same. The switch 130 will now close the circuit energizing the solenoid 142 thus subjecting piston 135 to the command of the gear pump. As a result, the piston 135 will move to the left when the primary clutch member runs faster than the secondary clutch member and it will move to the right when the primary clutch member runs slower than the secondary clutch member. The piston by acting through its rod 134 or lever 131 will control the throttle 133 in a manner causing the engine to reduce such difference in speed and to drive the primary clutch member at the same speed at which the secondary clutch member moves. Therefore, when a gear shifting operation has been performed resulting in a change of the rotary speed of the secondary clutch member, the engine will be so controlled as to produce a corresponding change in the speed of the primary clutch member. When the driver then re-engages the electro-magnetic clutch by suitable actuation of switch 130, no shock will be produced. Simultaneously, the cylinder 140 will be short-circuited by valve 143 permitting piston 135 to return to its normal central position.

In Fig. 5 a combined hydrostatic and electro-magnetic clutch is illustrated which embodies the system diagrammatically shown in Fig. 4 and described hereinabove.

Those elements appearing in Fig. 5, as have been shown in Fig. 4, are designated by the same reference numerals and since their function has been described hereinabove a brief description of the structure will suffice.

A disk 240 attached to a flange 241 of the crank shaft 242 of the engine by bolts and nuts 243 has teeth 244 for engagement with a starter pinion and carries a flanged cup-shaped member 245 attached thereto by bolts 246. The cup-shaped member 245 is integral with a sleeve 247 which is co-axially arranged with respect to the crank shaft 242 and accommodates the driven shaft 248 which, by means of an ordinary gear shift transmission and a rear axle transmission, is geared to the wheels of the vehicle. The member 245 forms a seat for the annular gear 103 and is suitably splined thereto. Moreover, the member 245 accommodates an annular clutch member 249 of iron having a plane end face 250 and an annular recess therein, such recess accommodating an energizing coil 251 which, when energized, produces a flux extending through an annular armature 252 likewise located inside of member 245 and having a plane inner face 253 extending parallel and opposed to the face 250 of member 249. The armature 252 is axially slidably, but non-rotatably connected with the cup-shaped member 245, for instance by a key 254. Projecting into the space between the two plane end faces 250 and 253, there is a sheet metal disk 255 which is suitably attached to a hub member 256 splined on shaft 248.

The elements 240, 245 and 103 constitute the driving clutch member H1.

The gear 101 is splined on the shaft 248, whereas the disk 231 carrying the pins 105 supporting the planetary gears 102 is freely rotatably mounted on shaft 248. Therefore, the driven member H2 formed by shaft 248 and gear 101 may freely rotate relative to the driving member H1 provided that no fluid will be entrapped between the teeth of the planetary gears and the gears 101 and 103, and further provided that the clutch disk 255 will not be clamped between the members 249 and 252. These two latter members constitute the electro-magnetic clutch E because, upon energization of coil 251, the armature 252 will be attracted by the member 249 and firmly clamp the disk 255 between the two faces 250 and 253.

The cylinder 111 accommodating the valve member 112 is suitably attached to the member 245 in radial position. The contact 121 is carried by a bushing 257 of insulating material attached to the upper end of the stem of valve member 112 projecting through a cover plate 258 attached to the cylinder 111. The contact 122 is carried by an insulating socket 259 mounted on the member 245.

Since the source of current 123 is preferably constituted by the battery of the vehicle, whereas the pair of contacts 121 and 122 are carried by the rotary member 245, the electrical connection diagrammatically represented in Fig. 4 as a wire 124 includes a slip ring shown at 260 and a brush 261. The cylinder 135, shown in Figure 4, must be suitably attached to the body or chassis of the vehicle, whereas the other elements of the hydraulic system revolve with the driven clutch member H1. Therefore, it will be necessary to include in lines 137 and 139 a peripheral groove provided in the driven clutch member H1, as shown at 262, and a stationary conduit communicating therewith. Moreover, a conduit 263 communicating with a peripheral groove 264 and a conduit 265 are provided for connecting the hydraulic system illustrated in Fig. 4 with a suitable source of oil or other fluid for the purpose of keeping the system filled at any time.

From the foregoing description of the two embodiments illustrated in Figs. 1 to 5 it will become apparent that the present invention affords a fully automatic operation of the clutch in a motor vehicle co-incidental to the starting or the stopping thereof or to a gear shift operation. All prior attempts to obtain such automatic control have not met with success. That applies primarily to the operation of friction clutches or hydrostatic clutches.

While a hydrodynamic clutch including an asynchronous rotor has a power characteristic suitable for a proper starting operation, it involves the disadvantages that a certain lag of the driven rotor with respect to the driving rotor will remain at any speed and that, with higher numbers of revolutions, the transfer of a torque cannot be entirely eliminated at the option of the driver without taking special additional measures. Where friction clutches are used, it has been proposed prior to the present invention to control the starting operation by centrifugal force. Where the clutch is directly engaged by centrifugal force, however, the starting operation will not satisfy the theoretical requirements since the clutch-engaging pressure will solely depend on the rotary speed of the centrifugal controller, i. e. on the speed of the engine. The latter, however, depends on the torque transferred by the engine through the clutch to the secondary clutch member and on the power characteristic of the engine determined, for instance, by the throttle adjustment. With friction clutches the torque transferred depends, for instance, on the pressure of engagement and the coefficient of friction. The coefficient of friction, however, which cannot be accurately determined is subject to considerable fluctuations when the speed varies, that is to say, when the pressure of engagement changes. Thus, the coefficient of friction in the condition of rest is much higher than it is in motion, being liable to result in an abrupt transition of the clutch members from the condition of relative rest to the condition of relative motion. As a result, the engagement of the clutch is liable to happen too abruptly, particularly with a sudden acceleration of the engine.

With hydrostatic clutches the torque transferred from the primary clutch member to the secondary clutch member depends on the throttling effect produced on the fluid circulation and such throttling effect in its turn depends on the cross section and shape of the fluid circuit and on the viscosity of the fluid. The viscosity, however, is liable to fluctuate when the temperature varies. In the absence of means adapted to measure the governing factors involved, a control of the starting operation is hardly possible and practicable, when such starting operation is to be made dependent on the torque of the engine so as to cause the torque transferred to suit the power production, e. g. the throttle adjustment prevailing at any time, the torque transferred to be as nearly constant as possible.

That problem has been solved by my above described invention, the same affording a comparatively simple and accurate control of the starting operation, more particularly in such a manner that during the starting operation any departure from the prescribed operating conditions of the driving engine is counteracted by the driven member or machine. It is an important feature of the present invention that the torque transferred by the clutch is automatically kept at a degree causing the starting speed of the driving engine to be kept more or less constant until the driven member, more particularly the secondary clutch member, has gained substantially the same speed as the driving member of the clutch or other torque transfer device. Moreover, it is another feature of the present invention that a predetermined starting speed is allotted to any position of the engine-controlling element, such as the throttle. Generally, it will be sufficient to predetermine a single constant starting speed which is the same for all positions of such engine-controlling element. That has been accomplished by means reducing the torque transferred when the engine speed drops below such predetermined starting speed and increasing the torque transferred when the speed of the engine rises above such predetermined starting speed. Preferably the starting speed is so elected as to be as low as possible, but still approaching the maximum torque the engine is able to produce with a corresponding adjustment of the engine-controlling element, i. e. with opened throttle. Preferably the torque transferred is controlled in dependence on the speed of the driving engine. When the engine is idling, the torque transferred from the driving engine to the driven member is reduced to zero, whereas such torque may be somewhat dependent upon the speed of the driven clutch member after the two clutch members have been synchronized. Theoretically, the torque transferred by the clutch will remain zero until the engine has reached its starting speed; however, it has been found useful to transfer a certain torque when the engine surpasses its idling speed in order to reduce its acceleration. The control of the clutch is preferably accomplished by a suitable controlling medium, such as a liquid, particularly where a friction clutch or a hydrostatic clutch is used, the latter being a clutch of the type in which the torque transferred is determined by throttling the cross section of the conduit in which the fluid circulates.

The clutch-engaging pressure may be produced by gear pumps including one pump element (e. g. a housing) mounted for common rotation with the driving shaft and a second pump element (e.g. one of the gears) mounted for common rotation with the driven shaft. Where I use a hydrostatic clutch, the use of a planetary gear pump offers particular advantages. Where an electro-magnetic clutch is used the torque transferred may be controlled by the variation of the energizing current.

It is particularly advantageous to provide an electro-magnetic clutch arranged, as it were, in shunt with the hydrostatic clutch, such electro-magnetic clutch being adapted to become operative automatically when the engine speed has surpassed the starting speed or when the lag of the driven clutch member behind the driving clutch member has dropped to a certain limit to automatically connect the driving member of the hydrostatic clutch with the driven member thereof, thus eliminating any power loss incidental to such lag. The electro-magnetic clutch is particularly adapted for such operation because of the simplicity of its operating and controlling means.

The term "clutch" as used hereinabove and in the claims following hereinafter is intended to embrace any engageable and disengageable connecting mechanism comprising a driving member and a driven member and adapted to transfer a torque from the former to the latter either with or without slip.

The term "speed transforming clutch" is intended to define a clutch in which the relative speed between the driving member and the driven member is continuously variable.

The term "friction clutch" denotes a clutch in which the transfer of a torque is accomplished by mechanical friction between the driving member and the driven member.

The term "hydrostatic clutch" embraces a clutch in which the torque is transferred from the driving member to the driven member by the pressure of entrapped liquid.

While I have described two preferred embodiments of my invention I wish to be clearly understood that the same is not limited to the details thereof but is capable of numerous modifications within the scope of the appended claims.

What I claim is:

1. In a motor-driven vehicle, the combination with a speed transforming clutch adapted to operate with different degrees of slippage and having a driving member co-operatively connected with the engine of the vehicle and a driven member geared to the wheels of the vehicle, of an adjustable clutch-controlling element connected with said driving member for determining the engaging force between said driving clutch member and said driven clutch member, of detecting means co-operatively co-ordinated to said driving member and adapted to detect any departure of the R. P. M. thereof from a predetermined starting speed, and of means co-operatively connecting said detecting means with said clutch-controlling element and adapted, whenever the R. P. M. of said driving member drop below said starting speed, to adjust said clutch-controlling element for a reduction of the engaging force and, whenever the R. P. M. of said driving member surpass said starting speed, to adjust said clutch-controlling element for an increase of the engaging force, thus keeping the R. P. M. of said driving member substantially constant during the acceleration of said driven member, said last-mentioned means including feed back means for limiting said engaging forces during said acceleration by said driving member.

2. In a motor-driven vehicle, the combination with a speed transforming clutch adapted to operate with different degrees of slippage and having a driving member co-operatively connected with the engine of the vehicle, a driven member geared to the wheels of the vehicle, and means constituting a fluid circuit and including a mechanism for controlling the torque to be transferred from said driving member to said driven member, of an adjustable valve connected with said driving member and operative in response to centrifugal forces for controlling said circuit and to thereby determine said torque, of detecting means co-operatively connected to said driving member and adapted to detect any departure of the R. P. M. thereof from a predetermined starting speed, and of means co-operatively connecting said detecting means with said valve to limit said torque during acceleration of said driving member by said engine under the control of the fluid in said fluid circuit and adapted, whenever the R. P. M. of said driving member drops below said starting speed, to adjust said valve for a reduction of said torque and, whenever the R. P. M. of said driving member surpass said starting speed, to adjust said valve for an increase of said torque, thus keeping the R. P. M. of said driving member substantially constant.

3. In a motor-driven vehicle, the combination with a friction clutch adapted to operate with different degrees of slippage and having a driving member co-operatively connected with the engine of the vehicle, a driven member geared to the wheels of the vehicle, and means constituting a fluid-circuit and including a piston for causing the engagement of said driving member with said driven member, of an adjustable valve adapted to control said circuit and to thereby determine the torque transferred by said friction clutch, of detecting means co-operatively connected to said driving member and adapted to detect any departure of the R. P. M. thereof from a predetermined starting rate, and of means co-operatively connecting said detecting means with said valve and adapted, whenever the R. P. M. of said driving member drop below said starting rate, to adjust said valve for a reduction of said torque, and whenever the R. P. M. of said driving member surpass said starting rate, to adjust said valve for an increase of said torque, thus keeping the R. P. M. of said driving member substantially constant.

4. In a motor-driven vehicle, the combination with a speed transforming hydrostatic clutch adapted to operate with different degrees of slippage and having a driving member co-operatively connected with the engine of the vehicle, a driven member geared to the wheels of the vehicle, and an adjustable valve adapted to control said hydrostatic clutch to thereby determine the torque transferred from said driving member to said driven member, of detecting means co-operatively connected to said driving member and adapted to detect any departure of the R. P. M. thereof from a predetermined starting rate, and of means operative only during acceleration of said driving member for limiting said torque below said predetermined speed and co-operatively connecting said detecting means with said valve and adapted, whenever the R. P. M. of said driving member drop below said starting rate, to adjust said valve for a reduction of said torque and, whenever the R. P. M. of said driving member surpass said starting rate, to adjust said valve for an increase of said torque, thus keeping the R. P. M. of said driving member substantially constant.

5. The combination set forth in claim 3 in which said fluid circuit is arranged in heat-exchange relation with at least one of said members for the purpose of cooling same.

6. In a motor-driven vehicle, the combination comprising a friction clutch adapted to operate with different degrees of slippage and composed of a driving member co-operatively connected with the engine of the vehicle and of a driven member geared to the wheels of the vehicle, a piston co-ordinated to said friction clutch and adapted to engage the same, means constituting a cylinder space accommodating said piston, a source of pressure fluid, a discharge conduit, a piston valve adapted in a first position to connect said space to said source and, in a second position, to connect said space to said discharge conduit and, in intermediate positions, to differentially connect said space to both said source and said conduit, detecting means co-operatively connected to said driving member and adapted to detect any departure of the R. P. M. thereof from a predetermined starting rate, means co-ordinated to said valve and controlled by said detecting means and adapted, whenever the R. P. M. of said driving member surpass said starting rate to produce a force tending to displace said valve to said first position, and means including a fluid conduit co-ordinated with said valve and said space and adapted to urge said valve towards said second position through a force produced by the fluid pressure prevailing in said space.

7. In a motor-driven vehicle, the combination comprising a friction clutch adapted to operate with different degrees of slippage and composed of a driving member co-operatively connected with the engine of the vehicle and of a driven member geared to the wheels of the vehicle, a piston co-ordinated with said friction clutch and adapted to engage the same, means constituting a cylinder space accommodating said piston and mounted for common rotation with one of said members, a source of pressure fluid, a discharge conduit, a piston valve adapted in a first position to connect said space to said source and, in a second position, to connect said space to said discharge conduit and, in intermediate positions, to differentially connect said space to both said source and said conduit, detecting means co-operatively connected to said driving member and adapted to detect any departure of the R. P. M. thereof from a predetermined starting rate, means co-ordinated with said valve and controlled by said detecting means and adapted, whenever the R. P. M. of said driving member surpass said starting rate to produce a force tending to displace said valve to said first position, and means including a fluid conduit co-ordinated to said valve and the said space adapted to urge said valve towards said second position through a force produced by the fluid pressure prevailing in said space.

8. The combination set forth in claim 7 in which said means co-ordinated with said valve and controlled by said detecting means include a spring mounted to act on said piston valve, an auxiliary piston adapted to bias said spring, and fluid control means co-ordinated to and governed by said detecting means and adapted to shift said auxiliary piston so as to bias said spring whenever the R. P. M. of said driving member of the clutch surpass said starting rate.

9. In a motor-driven vehicle, the combination set forth in claim 2 in which said detecting means comprises a fly-weight mounted for rotation with said driving member of the clutch, and a spring co-ordinated to said fly-weight and tending to restore same to normal position.

10. In a motor-driven vehicle, the combination set forth in claim 7 in which said detecting means comprises a fly-weight mounted for rotation with said driving member of the clutch, and a spring co-ordinated to said fly-weight and tending to restore same to normal position.

11. The combination set forth in claim 2 in which said detecting means co-operatively co-ordinated to said driving member comprises a fly-weight mounted for rotation with said driving member of the clutch, a restoring spring co-ordinated to said fly-weight, and means controlled by said fly-weight and adapted, when the R. P. M. of said driving member of the clutch substantially surpass the starting rate, to be rendered effective to produce a force acting on said fly-weight in the same sense as does the centrifugal force.

12. In a motor-driven vehicle, the combination comprising a friction clutch adapted to operate with different degrees of slippage and composed of a driving member co-operatively connected with the engine of the vehicle and of a driven member geared to the wheels of the vehicle, a piston co-ordinated to said friction clutch and adapted to engage the same, means constituting a cylinder space accommodating said piston, a source of pressure fluid, a discharge conduit, a piston valve adapted in a first position to connect said space to said source and, in a second position, to connect said space to said discharge conduit and, in intermediate positions, to differentially connect said space to both said source and said conduit, a fly-weight mounted for radial displacement and common rotation with said driving member of the clutch, a restoring spring associated with said fly-weight, means co-ordinated to said valve and controlled by said fly-weight and adapted, whenever the R. P. M. of said driving member surpass a predetermined starting rate to produce a force tending to displace said valve to said first position, means including a fluid conduit co-ordinated with said valve and space adapted to urge said valve towards said second position through a force produced by the fluid pressure prevailing in said space, and means controlled by said fly-weight and adapted, when the R. P. M. of said driving member exceed a certain limit above said starting rate, to produce a force acting on said fly-weight in the same sense as does the centrifugal force.

13. The combination set forth in claim 3 in which said means constituting a fluid circuit include a primary pump and a secondary pump, said primary pump being so co-ordinated to said driving member and said driven member of the clutch as to have an output proportional to the relative rotary speed of said members, said secondary pump being co-operatively connected with the driven member of said pump to have an output proportional to the rotary speed of said driven member.

14. The combination set forth in claim 3 in which said means constituting a fluid circuit include a primary pump co-operatively co-ordinated with said driving member and said driven member of the clutch and having an output proportional to the relative speed of said members, a secondary pump co-operatively connected with said driven member of the clutch having an output proportional to the rotary speed of said driven member, a valve adapted to alternatively render one or the other of said pumps effective, and means operable by said primary pump and adapted to shift said valve to the position rendering said secondary pump effective when the output of said primary pump drops below a certain limit.

15. The combination set forth in claim 3 in which said means constituting a fluid circuit include a primary pump co-operatively connected with the driving member and the driven member of the clutch and having an output proportional to the relative speed of the same, a secondary pump co-operatively connected with said driven member of the clutch and having an output proportional to the speed of said driven member, means constituting a cylindrical space mounted for rotation with said driving member of the clutch, a slide valve in said space adapted to alternatively render said pumps effective, a conduit connecting one end of said cylindrical space to said primary pump, and a spring inserted in the other end of said cylindrical space.

16. The combination set forth in claim 3 in which said means constituting a fluid circuit include a primary gear pump and a secondary gear pump, said primary gear pump being so co-ordinated to said driving member and said driven member of the clutch as to have an output proportional to the relative rotary speed of said members, said secondary gear pump being co-operatively connected with the driven member of said pump to have an output proportional to the rotary speed of said driven member.

17. In a motor-driven vehicle, the combination comprising a speed transforming hydrostatic clutch adapted to operate with different degrees of slippage and having a driving member co-operatively connected with the engine of the vehicle, a driven member geared to the wheels of the vehicle, said members constituting a rotary pump, a fluid circuit including said pump, a cylinder having ports included in said circuit, a slide valve in said cylinder for controlling at least one of said ports, said cylinder being connected with said driving member to operate said slide valve in response to centrifugal forces, a restoring spring associated with said valve, detecting means co-operatively connected to said driving member for detecting any departure of the R. P. M. thereof from a predetermined starting rate, and means operative in response to the output of said hydrostatic clutch to maintain the slippage thereof during acceleration of said driving member below said predetermined starting speed and co-operatively connecting said detecting means with said slide valve for adjusting said valve, whenever the R. P. M. of said driving member surpass said starting rate, to close one of said ports to thereby throttle said circuit.

18. In a motor-driven vehicle, the combination comprising a speed transforming hydrostatic clutch adapted to operate with different degrees of slippage and having a driving member co-operatively connected with the engine of the vehicle, a driven member geared to the wheels of the vehicle, said members constituting at least two rotary pumps, a fluid circuit including one of said pumps, a slide valve mounted on one of said members so as to be subject to a centrifugal force, said slide valve being co-ordinated to and adapted to control said circuit, a restoring spring associated with said valve member, detecting means mounted on said driving member and adapted to detect any departure of the R. P. M. thereof from a predetermined starting rate, means co-operatively connecting said detecting means with said slide valve and adapted, whenever the R. P. M. of said driving member surpass said starting rate, to adjust said slide valve to throttle said circuit and, whenever the R. P. M. of said driving member drop below said starting rate, to unthrottle said circuit, a control element adapted to control the engine of the motor vehicle, fluid-operable means connected with and adapted to adjust said control element, conduits connecting the other one of said pumps with said fluid-operable means, and means for enabling or disabling said fluid-operable means.

19. Apparatus for controlling the starting operation of a machine driven by an engine through a speed transforming clutch adapted to operate with different degrees of slippage, and having a driving member connected to said engine and a driven member connected to said machine, comprising means for gradually rendering said clutch effective with said machine still at rest and with said engine running, and means for automatically controlling the amount of slip of said clutch in dependence on the speed of said engine including means for retaining said engine speed substantially constant, at a speed providing a predetermined substantially constant torque output from said engine while the driven member of said clutch is accelerated to a speed substantially equal to the speed of said driving member by the torque transferred.

20. Apparatus for controlling the starting operation of a machine driven by an engine through a speed transformer clutch adapted to operate with different degrees of slippage and having a driving member connected to said engine and a driven member connected to said machine, comprising means for gradually rendering said clutch effective with said machine still at rest and with said engine running, means for detecting any deviation of the speed of said engine from a predetermined starting speed, said starting speed lying below the maximum speed of said engine, and means automatically increasing the torque transfer by said clutch with a positive deviation and for automatically reducing said torque with a negative deviation, said last-named means including feed-back means to reduce said torque during acceleration of said engine and being operative to control the torque until said machine is accelerated by the torque transfer and said driven member revolves at substantially the same speed as said driving member.

21. Apparatus for controlling the starting operation of a motor vehicle equipped with an internal combustion engine and a speed transforming clutch adapted to operate with different degrees of slippage and having a driving member connected with said engine and a driven member geared to the wheels of the vehicle, comprising means for gradually rendering said clutch effective with said vehicle still at rest and with said engine running, means for detecting any deviation of the speed of said engine from a predetermined starting speed, said starting speed approximately coinciding with the speed at which said internal combustion engine produces the highest torque, means for operating said clutch to increase the transfer of torque with a positive deviation and for reducing the transfer of torque by said clutch with a negative deviation, means for continuously rendering effective said operating means until said driven clutch member has substantially caught up with said driving member, and further means for actuating said clutch for transfer of the greatest possible torque of said engine irrespective of the speed thereof with said driven member operating at substantially the same speed as said driving member.

22. Apparatus for controlling the starting operation of a motor vehicle equipped with an internal combustion engine and a speed transforming clutch adapted to operate with different degrees of slippage and having a driving member connected with said engine and a driven member geared to the wheels of said vehicle, comprising means for simultaneously operating said engine at a low idling speed and for keeping said clutch in disabled condition, means for accelerating said engine up to a predetermined starting speed and for simultaneously rendering said clutch effective to transfer torque, means for detecting the deviation of the speed of said engine from said predetermined starting speed, control means for increasing the torque transfer by said clutch with a positive deviation and for reducing the torque transfer by said clutch with a negative deviation, said last-named means being operative to keep the speed of said engine substantially equal to said starting speed, means for rendering said control means effective only until the torque transfer by said clutch has caused the driven member thereof to substantially catch up with the driving member thereof, and means for establishing a non-slip connection between said driving member and said driven member of said clutch.

23. Apparatus for controlling the starting operation of a motor vehicle driven by an engine through a speed transforming clutch adapted to operate with different degrees of slippage and having a driven member connected to said engine and a driving member geared to the wheels of said vehicle, comprising means for initially rendering said clutch fully inoperative for transfer of any torque with said vehicle still at rest and said engine idling at a low number of revolutions, means for accelerating said engine to a predetermined starting speed and for simultaneously rendering said clutch effective to transfer a limited torque from said engine to the wheels of said vehicle during said acceleration and to thereafter transfer an increased torque including means for simultaneously controlling said clutch in dependence on the speed of said engine to retain said engine speed substantially constant after acceleration of said engine to said starting speed, means for rendering said control means operative until said driven member is accelerated to a speed substantially equaling said starting speed of said driving member by the torque transferred and means for rendering said clutch fully effective to transfer the torque produced by said engine.

24. Apparatus for controlling the starting operation of a motor vehicle driven by an engine through a speed transforming clutch adapted to operate with different degrees of slippage and having a driving member connected to said engine and a driven member geared to the wheels of said vehicle, comprising means for initially keeping said clutch in fully disabled condition inoperative to transfer any torque with the vehicle still at rest and said engine idling at a low number of revolutions, means for accelerating said engine to a predetermined starting speed and for rendering said clutch effective to transfer torque from the engine to the wheels of said vehicle including means for simultaneously controlling said clutch in dependence on the speed of said engine to retain said engine speed substantially constant, means for rendering said control means effective until the driven member of said clutch is accelerated by the torque transferred thereto to a speed substantially equaling said starting speed of said driving member, means for subsequently rendering said clutch fully effective to transfer any torque produced by said engine, means for rendering said last-named means operative until the speed of said driving member is reduced to a lower speed than said starting speed, and means for subsequently disabling said clutch.

25. In a motor-driven vehicle, the combination with a speed transforming hydrostatic clutch adapted to operate with different degrees of slippage and having a driving member co-operatively connected with the engine of the vehicle, a driven member geared to the wheels of said vehicle, and an adjustable valve for controlling said hydrostatic clutch to determine the torque to be transferred from said driving member to said driven member, of detecting means co-operatively connected to said driving member and adapted to detect any departure of the R. P. M. thereof from a predetermined starting rate, and of means co-operatively connecting said detecting means with said valve and adapted, whenever the R. P. M. of said driving member drop below said starting rate, to adjust said valve for a reduction of said torque and, whenever the R. P. M. of said driving member surpass said starting rate, to adjust said valve for an increase of said torque, thereby keeping the R. P. M. of said driving member substantially constant, and an electromagnetic clutch adapted to establish a non-slip connection between said driving member and said driven member of said hydrostatic clutch.

26. In a motor-driven vehicle, the combination with a speed transforming hydrostatic clutch adapted to operate with different degrees of slippage and having a driving member co-operatively connected with the engine of the vehicle, a driven member geared to the wheels of said vehicle, and an adjustable valve for controlling said hydrostatic clutch to determine the torque to be transferred from said driving member to said driven member, of detecting means co-operatively connected to said driving member and adapted to detect any departure of the R. P. M. thereof from a predetermined starting rate, and of means co-operatively connecting said detecting means with said valve and adapted, whenever the R. P. M. of said driving member drop below said starting rate, to adjust said valve for a reduction of said torque and, whenever the R. P. M. of said driving member surpass said starting rate to adjust said valve for an increase of said torque, thus keeping the R. P. M. of said driving member substantially constant, said hydrostatic clutch comprising a sun gear attached to one of said members, an internal gear attached to the other one of said members, a plurality of planetary gears meshing with both of said gears and constituting gear pumps therewith, at least some of said gear pumps being connected to a common fluid circuit controlled by said adjustable valve.

27. In a motor-driven vehicle the combination comprising a speed transforming hydrostatic clutch adapted to operate with different degrees of slippage and having a driving member co-operatively connected with the engine of said vehicle, a driven member geared to the wheels of said vehicle, said members constituting a rotary pump, a fluid circuit including said pump, a cylinder having ports included in said circuit, a slide valve in said cylinder for controlling at least one of said ports, said cylinder being connected with said driving member to operate said slide valve in response to centrifugal forces, a restoring spring associated with said valve, detecting means co-operatively connected to said driving member and adapted to detect any departure of the R. P. M. thereof from a predetermined starting speed, and means so-operatively connecting said detecting means with said slide valve and adapted, whenever the R. P. M. of said driving member surpass said starting speed, to adjust said valve to close one of said ports to thereby throttle said circuit, an electro-magnetic clutch adapted to establish a non-slip connection between said driving member and said driven member of said hydrostatic clutch, an electrical switch adapted to control said electro-magnetic clutch, and means operable by said slide valve and adapted, when the R. P. M. of said driving member surpass a limit above said starting rate, to close said switch to energize said electro-magnetic clutch.

28. In a motor-driven vehicle, the combination with a speed transforming hydrostatic clutch adapted to operate with different degrees of slippage and having a driving member co-operatively connected with the engine of the vehicle, a driven member geared to the wheels of the vehicle, and an adjustable valve adapted to control said hydrostatic clutch to thereby determine the torque to be transferred from said driving member to said driven member, of detecting means co-operatively connected to said driving member and adapted to detect any departure of the R. P. M. thereof from a predetermined starting rate, and of means cooperatively connecting said means with said valve and adapted, whenever the R. P. M. of said driving member drop below said starting rate to adjust said valve for a reduction of said torque and, whenever the R. P. M. of said driving member surpass said starting rate, to adjust said valve for an increase of said torque, thereby keeping the R. P. M. of said driving member substantially constant, an adjustable element adapted to control the engine of the vehicle, power-actuated means connected with said adjustable element, means for producing the power supplied to said power-actuated means in dependence on the relative speed of said driving member and said driven member of said hydrostatic clutch, and means operable by the driver for enabling or disabling said power-actuated means, whereby the driver may cause the engine to automatically reduce said relative speed to zero.

29. In combination with a variable clutch having a driving meember connected to a prime mover and a driven output member, speed responsive means for producing a control effect indicative of the deviation of said driving member from a predetermined constant starting speed, means operatively connected with said speed responsive means to vary the amount of coupling between said driving member and said driven member by said control effect and to thereby substantially limit operation of said driving member to said predetermined speed with said driven member operating at speeds lower than said predetermined constant starting speed, and control means for rendering said last-named means ineffective with said driven member operating at approximately said predetermined speed after acceleration thereof and for providing thereafter a predetermined amount of coupling between said driving member and said driven member.

30. In combination with a variable clutch having a driving meember connected to a prime mover and a driven output member, speed responsive means for producing a control effect indicative of the deviation of said driving member from a predetermined constant starting speed, means operatively connected with said speed responsive means to vary the amount of coupling between said driving member and said driven member by said control effect and to thereby substantially limit operation of said driving member to said predetermined speed with said driven member operating at speeds lower than said predetermined constant starting speed, and control means for rendering said last-named means ineffective with said driven member operating at approximately said predetermined speed after acceleration thereof and for providing thereafter a predetermined amount of coupling between said driving member and said driven member, said control means including means for rendering effective said means for varying the amount of coupling only after deceleration of one of said members to a second predetermined constant speed lower than said first-mentioned predetermined constant starting speed.

31. In a motor vehicle a clutch with a driving member and a driven member, pump means with one part thereof driven by said driving member and another part thereof driven by said driven member, thereby varying the output of said pump means in dependence on the difference in rotational speed between said driving and said driven member, means for controlling the rotational clutching torque transferred between said members including throttling means with an inlet line and an outlet line for the fluid supplied by said pump means and a throttling member between said inlet line and said outlet line, rotational speed regulating means including a speed regulating member adjustable in dependence on the rotational speed of said driving member and control means connected with said throttling means for subjecting said throttling member to a force tending to increase the throttling effect thereof in dependence on the existing rotational clutching torque during operation of said rotational speed regulating means below a predetermined starting rotational speed thereof.

32. The combination according to claim 31, further comprising a branch line intermediate said pump means and said inlet line for connecting said pump means with said speed regulating means and wherein said last-mentioned control means includes a further line connecting said speed regulating means with said throttling means to effect said increase in throttling effect.

33. The combination according to claim 31, further comprising means adapted to effect clutching engagement of said two parts independently of said pump means, and shifting means for rendering ineffective said pump means and for rendering effective said last-mentioned means after said driven member has reached said predetermined starting speed.

34. The combination according to claim 33, wherein said means adapted to effect clutching engagement of said two parts independently of said pump means includes a further pump driven by said another part.

35. The combination according to claim 33, wherein said means adapted to effect clutching engagement of said two parts independently of said pump means includes an electromagnetic clutch.

References Cited in the file of this patent

UNITED STATES PATENTS

| | | |
|---|---|---|
| 1,300,898 | Vincent | Apr. 15, 1919 |
| 1,818,910 | Sanine | Aug. 11, 1931 |
| 1,958,303 | Hayes | May 8, 1934 |
| 2,144,074 | Maybach | Jan. 17, 1939 |
| 2,178,050 | Peterson | Oct. 31, 1939 |
| 2,352,212 | Lang | June 27, 1944 |
| 2,613,549 | Thurber | Oct. 14, 1952 |
| 2,624,432 | Randol | Jan. 6, 1953 |

FOREIGN PATENTS

| | | |
|---|---|---|
| 421,204 | Great Britain | Dec. 17, 1934 |
| 654,482 | France | Apr. 6, 1929 |